United States Patent [19]
Fujii

[11] Patent Number: 5,757,888
[45] Date of Patent: May 26, 1998

[54] X-RAY APPARATUS

[75] Inventor: Tadashi Fujii, Kanagawa-ken, Japan

[73] Assignee: Fuji Photo Film Co., Ltd., Kanagawa, Japan

[21] Appl. No.: 887,630

[22] Filed: Jul. 3, 1997

[30] Foreign Application Priority Data

Jul. 3, 1996 [JP] Japan .................. 8-173860

[51] Int. Cl.$^6$ .................................. G03B 42/04
[52] U.S. Cl. .................................. 378/187; 378/185
[58] Field of Search .................. 378/182, 185, 378/187

[56] References Cited

U.S. PATENT DOCUMENTS 4,889,989  12/1989  Yoshimura et al. .......... 250/327.2
5,280,514  1/1994  Tago et al. .................... 378/187

FOREIGN PATENT DOCUMENTS 57-82827  5/1982  Japan ........................ 378/182

Primary Examiner—David P. Porta
Assistant Examiner—David Vernon Bruce
Attorney, Agent, or Firm—Sughrue, Mion, Zinn, Macpeak & Seas, PLLC

[57] ABSTRACT

In an X-ray apparatus, an X-ray film is placed in an closed space formed by front and rear sensitizer screen supports and a closing member fixed to one of the sensitizer screen supports so that a part of the X-ray film projects outside the closed space. The closed space is evacuated so that the sensitizer screens are brought into close contact with opposite sides of the X-ray film under vacuum. The front and rear sensitizer screen supports are movable between the X-raying position and a retracted position shifted from the X-raying position and are movable relative to each other in the retracted position between a closing position where the supports form the closed space together with the closing member and an open position where the supports form therebetween a wedge-shaped space flaring upward to permit insertion and removal of the X-ray film into and from the space. A transfer rollers hold the part of the X-ray film projected outside the closed space and insert and remove the X-ray film into and from the wedge-shaped space from above when the sensitizer screen supports are in the open position. Evacuation of the closed space is started as soon as the sensitizer screen supports are moved to the closing position in the retracted position.

1 Claim, 6 Drawing Sheets

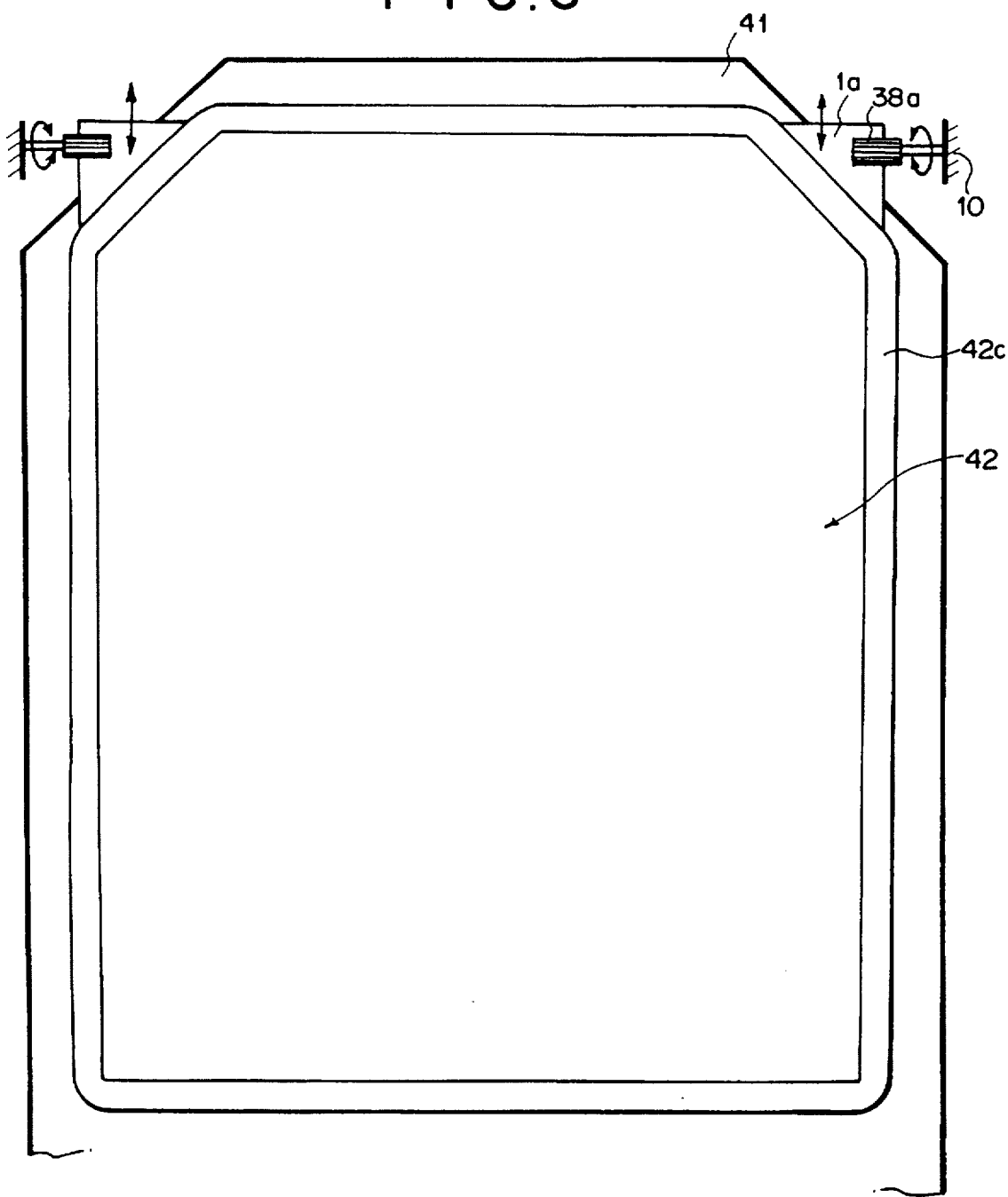

X-RAY APPARATUS

BACKGROUND OF THE INVENTION

1. Field of the Invention

This invention relates to an X-ray apparatus, and more particularly to an improvement in the structure for bringing an X-ray film into close contact with sensitizer screens under vacuum.

2. Description of the Related Art

As disclosed, for instance, in Japanese Patent Publication Nos. 5(1993)-67215 and 6(1994)-68608, there has been known especially in the medical field an X-ray apparatus provided with a film changer which transfers X-ray films one by one from a film magazine to a predetermined position in an X-raying section of the X-ray apparatus.

In such an X-ray apparatus, the X-ray film is generally sandwiched between a pair of sensitizer screens in close contact therewith in order to increase the sensitivity of the X-ray film to X-rays passing through the object.

The sensitizer screens are generally held on a pair of supports having a certain flatness and spaced from each other. After the X-ray film is inserted into between the supports, the supports are moved toward each other to bring the sensitizer screens into close contact with the X-ray film on opposite sides thereof. Then an X-ray image is recorded on the X-ray film in this state.

As the method of bringing the sensitizer screens into close contact with the X-ray film, there have been known a method in which the supports are pressed against the X-ray film therebetween by mechanical elements such as cams, links and the like, and a method in which a closing member such as a rubber packing is disposed to surround the X-ray film and the closed space defined by the closing member and the supports is evacuated so that the supports are resiliently deformed under the pressure difference between the inside and outside of the closed space, thereby bringing the sensitizer screens on the supports into close contact with the X-ray film.

It is said that the latter (will be referred to as "the vacuum contact system", hereinbelow) is advantageous over the former in that the sensitizer screens can be more uniformly brought into contact with the X-ray film.

In the X-ray apparatus described above, the X-ray film is transferred to the X-raying section from above the section for the simplicity of transfer of X-ray films in the apparatus. Most X-ray objects are the chests and when X-raying the chest, it is required to take an image of a widest possible area of the chest including the upper portion of the chest up to the throat.

Further in order to obtain an image with less error, it is required that the chest is held in close contact with the X-ray apparatus during exposure to X-rays. A chin rest is provided above the X-raying section in order to keep the chin away from the path of X-rays in the case where an area including the upper portion of the chest is to be X-rayed.

The chin rest makes it difficult to provide a space for transferring an X-ray film to the X-raying section from above in the X-ray apparatus. Accordingly the rear support is generally arranged to be movable back and forth and is moved rearward away from the chin rest, when the X-ray film is to be loaded, to provide a space for inserting the X-ray film between the front and rear supports.

Then the X-ray film inserted between the supports along the sensitizer screen on the rear support is attracted against the rear support by a suction means, and then the rear support is moved toward the front support to form said closed space together with the front support and the closing member.

In the vacuum contact system, the quality of the X-ray image is greatly affected by the contact time for which the X-ray film is kept in close contact with the sensitizer screens, and generally the longer the contact time is, the higher the quality is. This is due to the fact that it takes a certain time to purge air trapped between the X-ray film and the sensitizer screens, and when purge of air is insufficient, nonuniformity in image quality arises.

For example, after the pressure in the closed space reaches a predetermined vacuum, it takes at least 3 to 5 seconds for air between the sensitizer screens and the X-ray film to be released to a desired extent. Accordingly the contact time greatly affects the overall cycle time of the X-ray apparatus. Especially in the case of mass examination, the influence of the contact time is serious.

Further when the rear support is moved back and forth, the suction means must be moved back and forth together with the rear support. The suction means can be damaged through repeated back and forth movements. Further when the suction force supplied through the suction means is insufficient, the X-ray film can be dropped off the rear support on the way to the X-ray position.

SUMMARY OF THE INVENTION

In view of the foregoing observations and description, the primary object of the present invention is to provide an X-ray apparatus in which the cycle time of the X-ray apparatus can be shortened without fear of dropping the X-ray film.

In accordance with the present invention, the front support as well as the rear support is moved rearward to a retracted position away from the chin rest, and the X-ray film is inserted between the supports in the retracted position, and the sensitizer screens on the front and rear supports are brought into close contact with the X-ray film under vacuum in the retracted position. With this arrangement, the time the supports take to return to the X-raying position can be used as the contact time and at the same time, the suction means for attracting the X-ray film against the rear support becomes unnecessary.

That is, in accordance with the present invention, there is provided an X-ray apparatus in which an X-ray film is placed in an closed space formed by front and rear sensitizer screen supports and a closing member fixed to one of the sensitizer screen supports so that a part of the X-ray film projects outside the closed space, the sensitizer screen supports being opposed to each other and each of the sensitizer screen supports carrying thereon a sensitizer screen, the closed space is evacuated by a suction means so that the sensitizer screens are brought into close contact with opposite sides of the X-ray film under vacuum and the X-ray film is exposed in an X-raying position to X-rays emitted from an X-ray source and passing through an object, wherein the improvement comprises that said front and rear sensitizer screen supports are movable between said X-raying position and a retracted position shifted from the X-raying position in a direction away from the X-ray source and are movable relative to each other in the retracted position between a closing position where the supports form said closed space together with the closing member and an open position where the supports form therebetween a wedge-shaped space flaring upward to permit insertion and removal of the X-ray film into and from the space, a transfer means holds the part of the X-ray film which is to be projected outside the closed space and inserts and removes the X-ray film into and from the wedge-shaped space from above when the sensitizer screen supports are in the open position, and a control means which starts to operate the suction means as soon as the sensitizer screen supports are moved to the closing position in the retracted position.

In this specification, "front" means the side nearer to the object or the X-ray source.

In the X-ray apparatus in accordance with the present invention, the X-ray film is inserted into the space between the front and rear supports in the retracted position held by the transfer means and as soon as the supports are closed, the closed space is evacuated to bring the sensitizer screens on the supports into close contact with the X-ray film. Then the supports are returned to the X-raying position. Accordingly the time the supports take to return to the X-raying position can be used as the contact time.

Further by keeping the X-ray film held by the transfer means until the sensitizer screens on the supports are brought into contact with the X-ray film to some extent, the suction means for attracting the X-ray film against the rear support in the conventional system becomes unnecessary. Further since the supports are closed in the retracted position, the transfer means need not be moved to the X-raying position together with the supports unlike the suction means in the conventional system, there is no fear that the transfer means is damaged through repeated back and forth movements.

Further since the sensitizer screens on the supports are brought into contact with the X-ray film to some extent in the retracted position, there is no fear that the X-ray film is dropped off on the way to the X-raying position.

BRIEF DESCRIPTION OF THE DRAWINGS

FIG. 6 is a rear view showing an important part of the X-raying section of the X-ray apparatus.

DESCRIPTION OF THE PREFERRED EMBODIMENT

Figure 1:
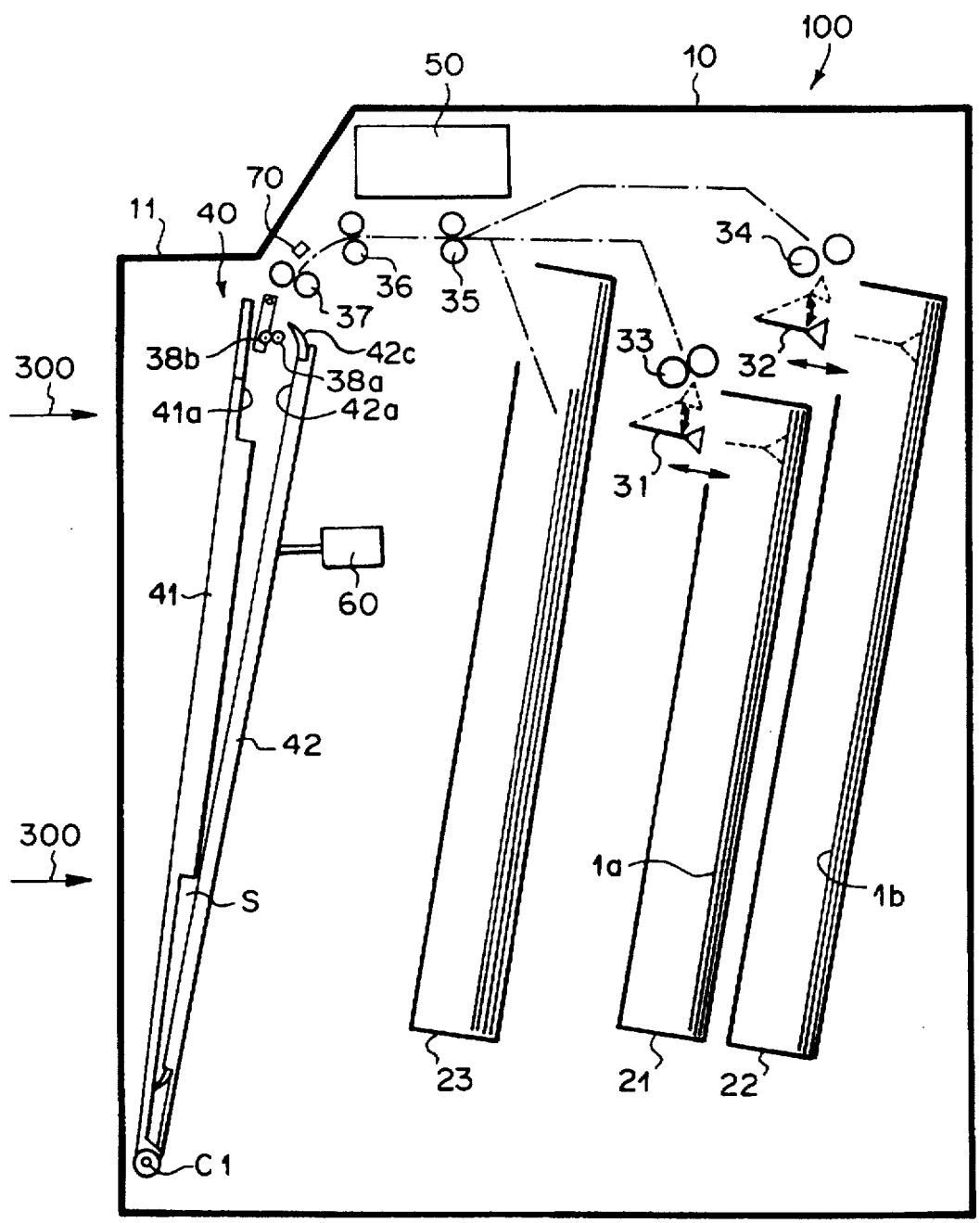
FIG. 1 is a schematic view showing an X-ray apparatus in accordance with an embodiment of the present invention.

In FIGS. 1 to 6, an X-ray apparatus 100 in accordance with an embodiment of the present invention is mainly for recording an X-ray image 300 of the chest of a human body (not shown) on an X-ray film, and comprises an outer frame 10, a pair of supply magazines 21 and 22 respectively containing therein a plurality of virgin X-ray films 1a and 1b of different lengths, and a pair of film take-out means 31 and 32 respectively for taking out the X-ray films 1a and 1b one by one from the supply magazines 21 and 22. One of the film take-out means 31 and 32 is selectively operated under the control of a film selecting means (not shown). A conveyor means comprising conveyor rollers 33 to 37 conveys the X-ray film 1 (1a or 1b ) taken out from the supply magazine 21 or 22 to a film transfer means. The conveyor rollers 33 receive the X-ray film 1a from the film take-out means 31 and deliver it to the conveyor roller 35 and the conveyor rollers 34 receive the X-ray film 1b from the film take-out means 32 and deliver it to the conveyor rollers 35. The film transfer means comprises rollers 38a and 38b (to be described in detail later), and transfers the X-ray film 1 to an X-raying section 40 and removes the X-ray film 1 from the X-raying section 40. The X-raying section 40 comprises front and rear sensitizer screen supports 41 and 42 which are brought into close contact with the X-ray film 1 on opposite sides thereof. A vacuum control system 60 controls the pressure inside an enclosed space S formed between the sensitizer screen supports 41 and 42 as will be described later. An ID recorder 50 records the ID number of the object in the upper edge portion of the X-ray film 1. The exposed X-ray films 1 are stored in a receipt magazine 23.

A chin rest 11 is formed on the outer frame 10 just above the X-raying section 40 and the object stands with his or her chin on the chin rest 11 when X-raying the chest thereof.

A pair of sensitizer screens 41a and 42a are held respectively on the rear side of the front support 41 and the front side of the rear support 42. When X-raying, the X-ray film 1 is held between the sensitizer screens 41a and 42a. A packing 42c is provided on the rear support 42 to surround the sensitizer screen 42a thereon. When the sensitizer screen supports 41 and 42 are closed as will be described later, the packing 42c forms a, air-tight closed space S together with the sensitizer screen supports 41 and 42.

The sensitizer screen supports 41 and 42 are substantially square in shape but two upper corners thereof are obliquely cut away and the two upper corner portions of the X-ray film 1 project outside the closed space S when the X-ray film 1 is loaded in the space S as clearly shown in FIG. 6.

Figure 3:
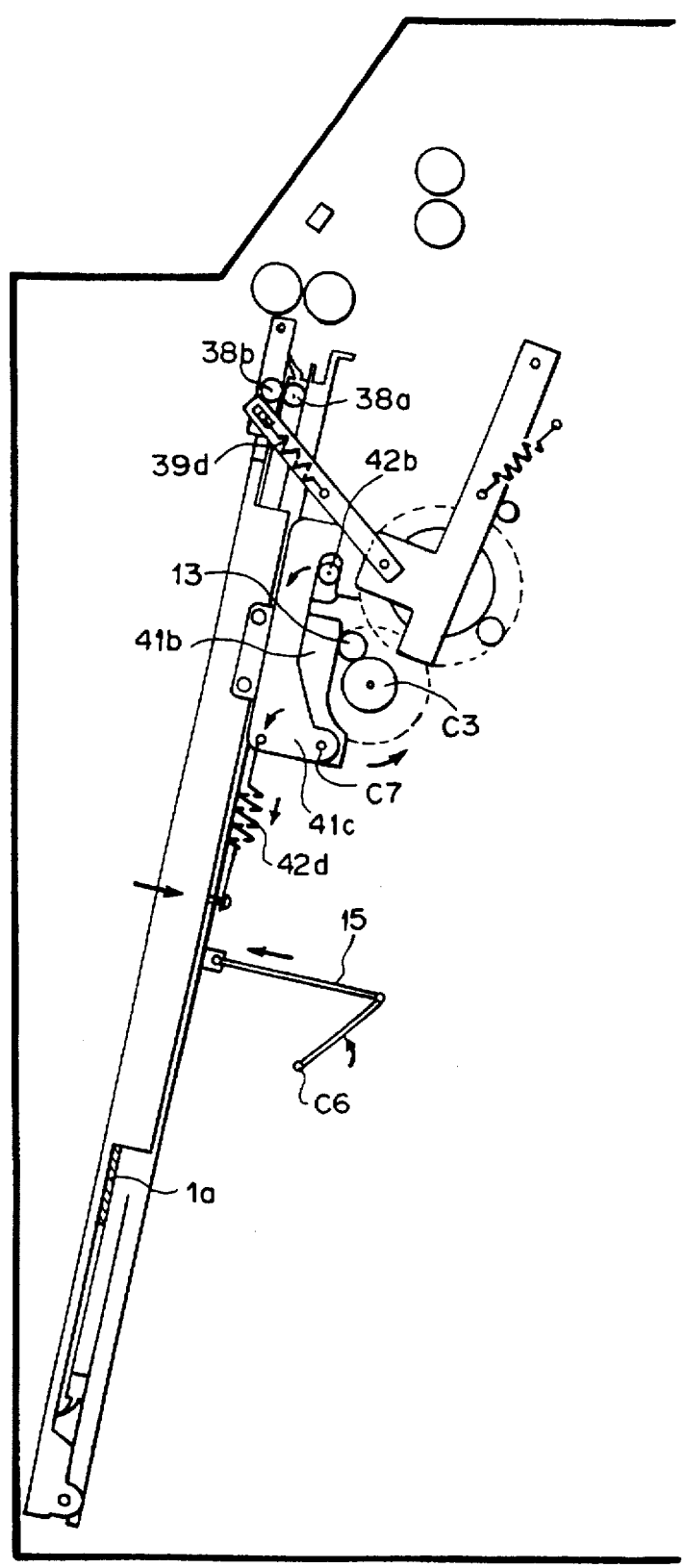
Figure 4:
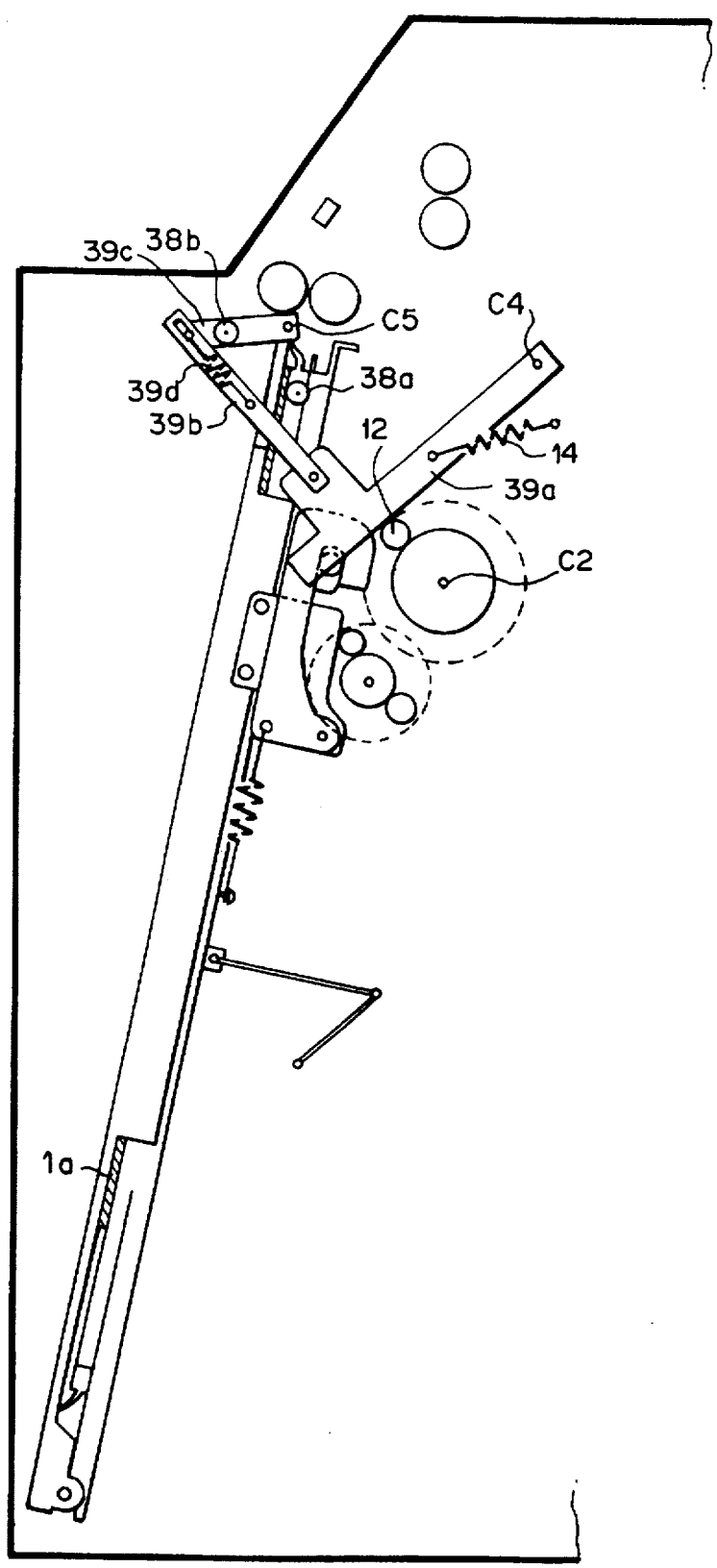
Figure 5:
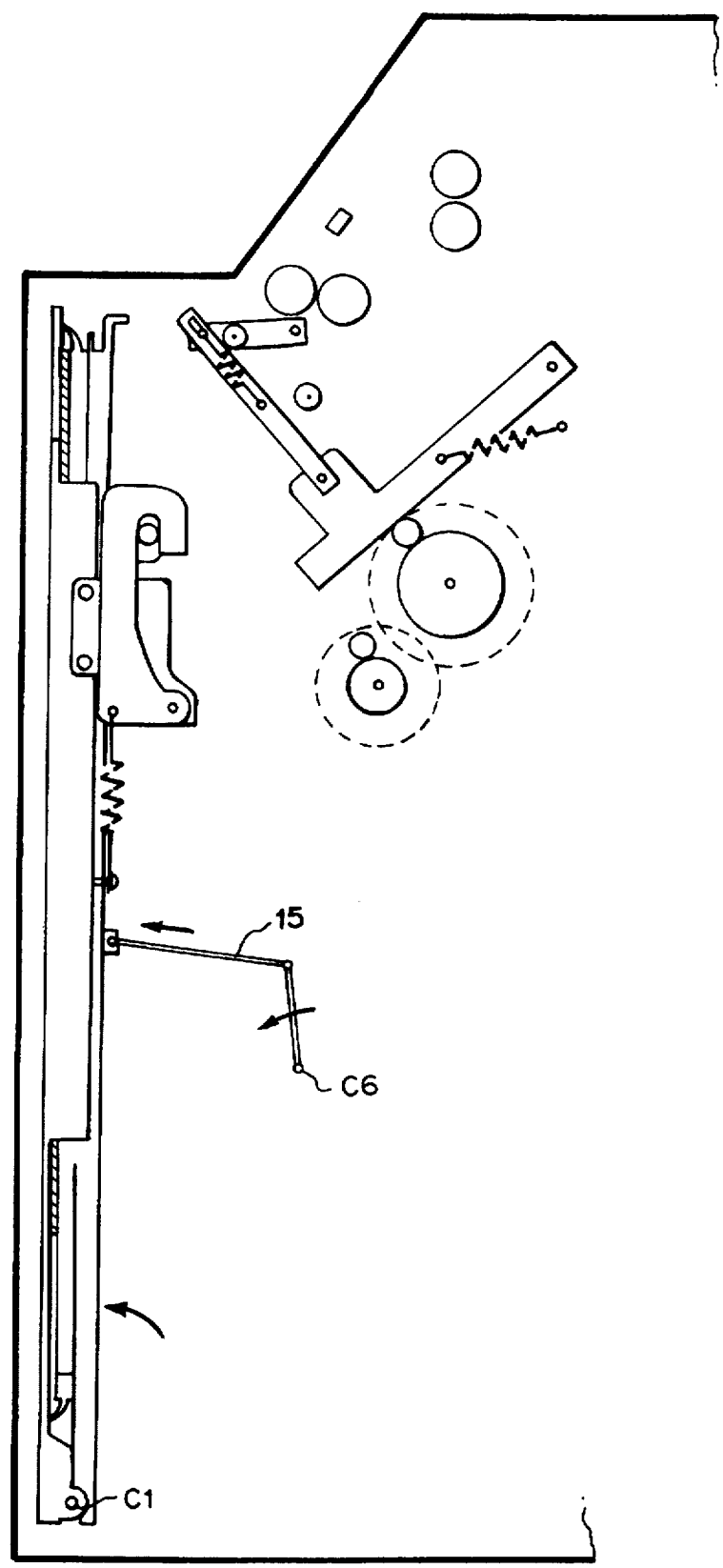

The sensitizer screen supports 41 and 42 are rotatable about a shaft C1 between the X-raying position where they are erected along the front face of the outer frame 10 as shown in FIG. 5 and a retracted position away from the X-raying position as shown in FIGS. 1 to 4.

Figure 2:
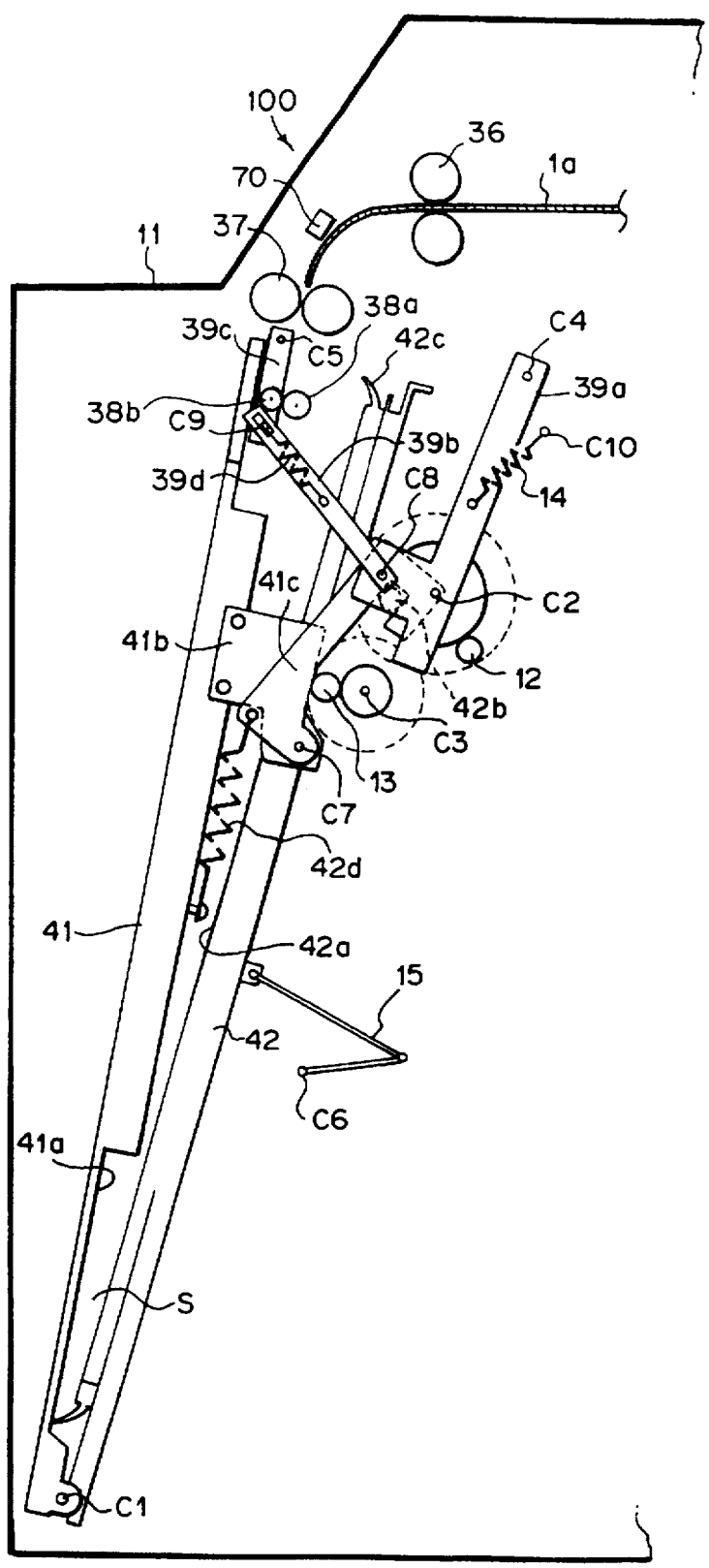
FIGS. 2 to 5 are views for illustrating different states of the X-ray apparatus.

As shown in FIG. 2, the front sensitizer screen support 41 is provided with a pair of brackets 41b on opposite side edges thereof, and a driven arm 41c is mounted on each of the brackets 41b to be rotatable about a shaft C7. In the retracted position, the rear edge of each bracket 41b is in contact with a cam 13 which is mounted on the outer frame 10 to be rotatable about a shaft C3.

As shown in FIG. 3, the rear support 42 is provided with a pair of brackets on opposite side edges thereof and a pin 42b is fixed to each bracket. A free end of the driven arm 41c is engaged with the pin 42b so that the driven arm 41c is rotatable about the pin 42b. A link 15 which is mounted for rotation about a shaft C6 on the outer frame 10 at its one end is connected to the rear support 42 at its the other end.

One end of a tensile spring 42d is connected to the driven arm 41c and the other end of the tensile spring 42d is connected to the front support 41, whereby the driven arm 41c is urged counterclockwise direction as seen in FIGS. 1 to 5. As can be understood later, the tensile spring 42d after all urges the front and rear supports 41 and 42 toward each other.

The transfer means comprises a pair of drive rollers 38a and a pair of free rollers 38b. The drive rollers 38a projects inward from opposite side walls of the outer frame 10 and are brought into contact with the rear side of the X-ray film 1 at the portions projecting outside the closed space S as shown in FIG. 6. The free rollers 38b are supported on a pair of links 39c which are mounted on the outer frame 10 to be rotatable about shafts C5 and moved between an operative position where they are opposed to the respective drive rollers 38a intervening therebetween the X-ray film 1 and an inoperative position where they are away from the drive roller 38a. A cam 12 is mounted on the outer frame 10 for rotation about a shaft C2. A T-shaped link 39a is mounted for rotation about a shaft C4 on the outer frame 10 at its first end and is urged in the counterclockwise direction by a tensile spring 14. A second end of the T-shaped link 39a and the free end of the link 39c is connected by a link 39b.

The link 39b is rotatable relative to the link 39c about a shaft C9 which is fixed to the link 39c and received in an elongated opening in the link 39b. The shaft C9 is connected to the link 39b by way of a tensile spring 39d and the shaft C9 is movable in the longitudinal direction of the link 39b along the elongated opening overcoming the force of the spring 39d. The link 39b is rotatable about a shaft C8 relative to the link 39a.

The film take-out means 31 and 32 are selectively operated under the control of a film selecting means to deliver the shorter X-ray film 1a or the longer X-ray film 1b according to instruction input, for instance, by the operator to the conveyor means. Each of the film take-out means 31 and 32 holds the X-ray film 1 under vacuum as shown by the broken line in FIG. 1. Such a film take-out means need not be provided for each supply magazine. For example, a single film take-out means may be provided and arranged to move to selected one of the magazines to take out the X-ray film 1 in the magazine under the control of the film selecting means.

Operation of the X-ray apparatus of this embodiment will be described, hereinbelow.

When the operator inputs instruction on which of the X-ray films 1a and 1b is to be used into the film selecting means, one of the film take-out means 31 and 32 is operated to take out an X-ray film 1 (1a or 1b ) from the corresponding supply magazine (21 or 22), and the film take-out means transfers the X-ray film 1 to the conveyor rollers 33 or 34 holding the film 1 under vacuum. At this time, the sensitizer screen supports 41 and 42 are held in the retracted position shown in FIG. 2 and held in the open state (the upper ends of the supports 41 and 42 are held apart from each other).

In this state, the X-ray film 1 is conveyed to the X-raying section 40 by the conveyor rollers 33 or 34, 35, 36 and 37. The leading end portion of the X-ray film 1 emanating from the conveyor rollers 37 is inserted between the drive rollers 38a and the free rollers 38b and the X-ray film 1 is introduced into the space between the sensitizer screen supports 41 and 42 by the drive rollers 38a and the free rollers 38b. Since the space between the sensitizer screen supports 41 and 42 is relatively narrow and becomes narrower as the X-ray film 1 enters deep into the space, the X-ray film 1 can be smoothly inserted into the space even if the X-ray film 1 curls.

A detector 70 for detecting the trailing end of the X-ray film 1 is disposed between the conveyor rollers 36 and the conveyor rollers 37, and the conveyor rollers 37 and the drive rollers 38a are stopped a predetermined time after detection of the trailing end by the detector 70. The predetermined time is determined on the basis of the conveying speed and the distance of conveyance left so that the trailing end portion of the X-ray film 1 is contained in the space between the supports 41 and 42 with the corners of the trailing end portion held by the drive rollers 38a and the free rollers 38b as shown in FIG. 6. The position in which the X-ray film 1 is stopped is determined on the basis of the trailing end and is constant irrespective of the size of the film 1.

Thereafter the cam 13 is rotated about the shaft C3 in the clockwise direction and is retracted from the rear edge of the bracket 41b on the front support 41, whereby the driven arm 41c is rotated about the shaft C7 in the counterclockwise direction under the force of the tensile spring 42d and the front support 41 is rotated rearward or in the clockwise direction about the shaft C1 through the engagement of the free end of the driven arm 41c with the pin 42b on the rear support 42. In response to the rearward rotation of the front support 41, the link 16 is rotated in the counterclockwise direction about the shaft C6 to rotated the rear support 42 forward. Thus the front and rear supports 41 and 42 are brought into the closed state shown in FIG. 3.

In the closed state of the supports 41 and 42, the X-ray film 1 is surrounded by the supports 41 and 42 and the packing 42c except the rear (upper) corners thereof. The surrounded space forms an air-tight closed space S.

Then the vacuum control system 60 starts evacuating the closed space S and the pressure inside the closed space S begins to lower. At this time, the sensitizer screens 41a and 42a on the front and rear supports 41 and 42 begin to be brought into contact with the X-ray film 1 on opposite sides thereof. In this state, the X-ray film 1 is held by the supports 41 and 42.

Then the cam 12 is rotated about the shaft C2 into abutment against the rear edge of the link 39a and rotates the link 39a about the shaft C4 in the clockwise direction overcoming the force of the tensile spring 14 as shown in FIG. 4.

The rotation of the link 39a causes the link 39c by way of the link 39b to rotate about the shaft C5 in the clockwise direction, whereby the free roller 38b is moved away from the X-ray film 1 and the X-ray film 1 is released from the drive rollers 38a and the free rollers 38b.

Then the link 15 is further rotated about the shaft C6 in the counterclockwise direction to rotate the supports 41 and 42 integrally with each other about the shaft C1, thereby bringing the supports 41 and 42 to the X-raying position.

Evacuation of the closed space S is continued until the vacuum in the space S reaches a predetermined value.

Since a desirable contact of the sensitizer screens 41a and 42a with the X-ray film 1 cannot be obtained until a certain time (e.g., 3 to 5 seconds) lapses after the pressure in the closed space reaches the predetermined vacuum, preparation for X-raying is completed the certain time after ending of evacuation of the closed space S.

Though that a predetermined time waiting is necessary after ending of evacuation of the closed space S is common to the X-ray apparatus of the present invention and the conventional X-ray apparatus, the X-ray apparatus of the present invention is advantageous over the conventional X-ray apparatus in that evacuation of the closed space S can be started in the retracted position as soon as the sensitizer screen supports 41 and 42 are closed before they are moved to the X-raying position unlike the conventional X-ray apparatus where only the rear support is moved to the retracted position and evacuation of the closed space cannot be started until the rear support is returned to the X-raying position and forms the closed space together with the front support. Accordingly in the X-ray apparatus of the present invention, waiting after the X-ray film 1 is conveyed to the X-raying section 40 can be reduced.

After preparation for X-raying is completed, X-rays are projected onto the object and the X-ray film 1 is exposed to X-rays 300 passing through the object, whereby an X-ray image is recorded on the X-ray film 1 as a latent image under the assistance of the sensitizer screens 41a and 42a.

Thereafter the sensitizer screen supports 41 and 42 holding therebetween the exposed X-ray film 1 is moved to the retracted position in the procedure reverse to that for moving them from the retracted position to the X-raying position (FIG. 4). Further the cam 12 is reversed to bring the free rollers 38b into contact with the front side of the X-ray film 1 to hold the upper corners of the X-ray film 1 together with the drive rollers 38a (FIG. 3).

In this state, the X-ray film 1 is nipped between the free rollers 38b and the drive rollers 38a only under the force of the tensile spring 39d, whereby the X-ray film 1 is held by an adequate nipping force.

Thereafter the vacuum control system 60 introduces air into the closed space S to release the X-ray film 1 from the sensitizer screens 41a and 42a, and the cam 13 is reversed to open the supports 41 and 42 (FIG. 2).

Then the drive rollers 38a are rotated in the reverse direction to take out the X-ray film 1 from the space between the supports 41 and 42. The X-ray film 1 is delivered to the conveyor rollers 37 which are rotating in the reverse direction. The X-ray film 1 is once stopped between the rollers 35 and 36 and the ID recorder 50 records the ID number of the object or the like on a part of the X-ray film 1. The part where the ID number or the like is recorded is shielded from X-rays during X-raying.

Then exposed X-ray film 1 is conveyed into the receipt magazine 23 by the rollers 35.

As can be understood from the description above, in the X-ray apparatus in accordance with the present invention, the time required to prepare the X-ray film 1 for X-raying is shortened and the overall cycle time of the X-ray apparatus can be shortened.

Further since the sensitizer screens 41a and 42a on the supports 41 and 42 are brought into contact with the X-ray film 1 to some extent in the retracted position, there is no fear that the X-ray film 1 is displaced from the predetermined position on the way to the X-raying position, whereby reliability of the X-ray apparatus can be improved.

What is claimed is:

1. An X-ray apparatus in which an X-ray film is placed in an closed space formed by front and rear sensitizer screen supports and a closing member fixed to one of the sensitizer screen supports so that a part of the X-ray film projects outside the closed space, the sensitizer screen supports being opposed to each other and each of the sensitizer screen supports carrying thereon a sensitizer screen, the closed space is evacuated by a suction means so that the sensitizer screens are brought into close contact with opposite sides of the X-ray film under vacuum and the X-ray film is exposed in an X-raying position to X-rays emitted from an X-ray source and passing through an object, wherein the improvement comprises that said front and rear sensitizer screen supports are movable between said X-raying position and a retracted position shifted from the X-raying position in a direction away from the X-ray source and are movable relative to each other in the retracted position between a closing position where the supports form said closed space together with the closing member and an open position where the supports form therebetween a wedge-shaped space flaring upward to permit insertion and removal of the X-ray film into and from the space, a transfer means holds the part of the X-ray film which is to be projected outside the closed space and inserts and removes the X-ray film into and from the wedge-shaped space from above when the sensitizer screen supports are in the open position, and a control means which starts to operate the suction means as soon as the sensitizer screen supports are moved to the closing position in the retracted position.

* * * * *